United States Patent
Mathew et al.

(10) Patent No.: US 6,807,317 B2
(45) Date of Patent: Oct. 19, 2004

(54) METHOD AND DECODER SYSTEM FOR REDUCING QUANTIZATION EFFECTS OF A DECODED IMAGE

(75) Inventors: Reji Mathew, Riverwood (AU); Jian Zhang, Enfield (AU)

(73) Assignee: Motorola, Inc., Schaumburg, IL (US)

( * ) Notice: Subject to any disclaimer, the term of this patent is extended or adjusted under 35 U.S.C. 154(b) by 64 days.

(21) Appl. No.: 10/280,903

(22) Filed: Oct. 25, 2002

(65) Prior Publication Data

US 2004/0081368 A1 Apr. 29, 2004

(51) Int. Cl.⁷ .......................... G06K 9/40; G06K 9/46; H04N 7/12
(52) U.S. Cl. ..................... 382/266; 382/233; 382/251; 375/240.29
(58) Field of Search ................................ 382/232, 233, 382/250, 251, 263, 264, 266, 269, 270, 275, 268, 261, 279; 348/395.1, 420.1; 375/240.03, 240.2, 240.27, 240.29; 358/463

(56) References Cited

U.S. PATENT DOCUMENTS

| | | | | |
|---|---|---|---|---|
| 5,359,676 A | * | 10/1994 | Fan | 382/246 |
| 5,489,942 A | * | 2/1996 | Kawahara | 375/240.12 |
| 5,495,538 A | * | 2/1996 | Fan | 382/233 |
| 5,819,035 A | | 10/1998 | Devaney et al. | |
| 5,844,614 A | * | 12/1998 | Chong et al. | 375/240.24 |
| 6,148,115 A | * | 11/2000 | Mackinnon et al. | 382/266 |
| 6,175,596 B1 | * | 1/2001 | Kobayashi et al. | 375/240.27 |
| 6,317,522 B1 | * | 11/2001 | Rackett | 382/268 |

FOREIGN PATENT DOCUMENTS

WO  WO99/22509  5/1999

* cited by examiner

*Primary Examiner*—Kanji Patel
(74) *Attorney, Agent, or Firm*—Daniel K. Nichols; Valerie M. Davis

(57) ABSTRACT

A method (200) and decoder system (100) for reducing quantization effects or ringing artifacts imposed upon decoded image of hybrid block based coding schemes such as MEPG and H 261. The system (100), in use, and method (200) receive (220) decoded image decoded blocks that were decoded from transform coded blocks quatized by a selected quantization parameter. The system (100) and method (200) then analyze (230) selected pixel values of selected pixels with neighboring pixel values of associated neighboring pixels in the decoded blocks to determine difference values for each of the selected pixels. Potential object edges, of the decoded image represented by the decoded blocks, are then detected (240) to identify the selected pixels as edge pixels, the detecting is effected by comparing the difference values with selected threshold values that are determined with respect to the selected quantization parameter associated with the blocks. The selected threshold values have a non-linear relationship with varying quantization parameter values of the image. The selected pixel values are modified (250) if they are not identified as edge pixels.

9 Claims, 1 Drawing Sheet

METHOD AND DECODER SYSTEM FOR REDUCING QUANTIZATION EFFECTS OF A DECODED IMAGE

FIELD OF THE INVENTION

This invention relates to reducing quantization effects of a decoded image. The invention is particularly useful for, but not necessarily limited to, reducing quantization effects of decoded images that were previously coded by Discrete Cosine Transformation (DCT).

BACKGROUND OF THE INVENTION

Most existing image and video coding standards such as H.261, H.263 and MPEG for example are typically based upon hybrid block coding algorithms. These algorithms incorporate transformations (such as the Discrete Cosine Transform (DCT)) and various quantization methods. The lossy nature of the quantization methods employed within a block based coding architecture introduces into a decoded image unwanted artifacts which impinge upon the quality of the reconstructed image.

Examples of such artifacts which may be introduced are blocking artifacts and ringing artifacts. The blocking artifact is characterized by the appearance of block edge effects and a visible discontinuity between adjacent blocks, especially in areas of low detail within the image. Generally blocking occurs when coarse quantization levels are used to code DCT coefficients. Ringing is generally distortion appearing near strong edges in an image due to the truncation of high spatial frequencies by the Quantization process. In moving images ringing is visible as a slight flickering near the image edges There are various techniques to reduce the effects of ringing introduced in block coding schemes. One such example is described in U.S. Pat. No. 5,819,035 to Devaney et al. entitled "Post-Filter for removing ringing artifacts of DCT coding". The disclosed post-filter primarily uses anisotropic diffusion to remove the ringing artifacts from the decoded data images. The filter processes individual blocks of pixels, assigning an individual edge significance threshold to each block. Noise removal occurs if the edge strength is below the threshold.

Another example is contained in International Patent Publication No. WO 99/22509 in the name of Samsung Electronics Co., Ltd. entitled "Image data post-processing method for reducing quantization effect, apparatus therefore". This publication discloses an image data post-processing method for reducing quantization effects such as blocking artifacts, corner outliers and ringing noise, from a decompressed image. The method involves the detection of a semaphore which represents whether or not post-processing is required and only filtering those decoded image blocks for which the corresponding semaphore has been signaled.

An article in *Electronics Letters*, vol. 34, no. 22, pp. 2110–2112, October 1998 addressing the use of a de-ringing filter in video communications by Dr André Kaup entitled "Reduction of ringing noise in transform image coding using a simple adaptive filter" discloses a de-ringing filter which is constructed from an adaptive low pass filter where the filter mask varies depending upon the local image characteristics. The filter is adaptive in two ways. First only those neighboring pixels wherein their corresponding grey levels are within a certain confidence interval around the pixel to be filtered are included in the filter mask. Secondly the filter mask is strictly local since only the pixels within a 3×3 window around the current pixel are considered.

The MPEG-4 Verification Model, as set out in ISO/IEC JTC 1/SC 29/WG 11 N4350, Sydney, July 2001, includes a de-ringing algorithm. This algorithm has heretofore been considered as "best in class" for de-ringing of coded video. The algorithm performs de-ringing at a macro-block level each macro-block needs to be read in from memory and processed in turn.

Each of above disclose various forms of de-ringing algorithms that employ various object edge detection methods, such as selecting threshold values having a linear relationship with the quantization parameters used during decoding, to determine which pixels require post process filtering to eliminate ringing artifacts.

In this specification, including the claims, the terms 'comprises', 'comprising' or similar terms are intended to mean a non-exclusive inclusion, such that a method or apparatus that comprises a list of elements does not include those elements solely, but may well include other elements not listed.

SUMMARY OF THE INVENTION

According to one aspect of the invention there is provided a method for reducing quantization effects of a decoded image, the method comprising the steps of:

receiving at least part of a decoded image comprising decoded blocks that were decoded from transform coded blocks quantized by a selected quantization parameter;

analyzing selected pixel values of selected pixels with neighboring pixel values of associated neighboring pixels in said decoded blocks to determine difference values for each of said selected pixels;

detecting potential object edges, of the decoded image represented by the decoded blocks, to identify said selected pixels as edge pixels, said detecting being effected by comparing said difference values with selected threshold values that are determined with respect to said selected quantization parameter associated with a selected one of said blocks, said selected threshold values having a non-linear relationship with varying quantization parameter values of said image; and modifying said selected pixel values of said selected pixels that are identified as not being edge pixels.

Suitably, the analyzing step may comprise selecting three by three pixel arrays and comparing only said selected pixel values that are associated with a central pixel of each of said arrays with said neighboring pixel values of only said neighboring pixels that are adjacent to and either aligned directly vertical with or horizontal with said central pixel.

Preferably, the detecting step may be characterized by said comparing comprising a first comparison with respect to first threshold value, and wherein the detecting step further includes a second comparison with respect to second threshold value wherein pairs of said directly aligned vertical pixels adjacent said central pixel and pairs of said directly aligned horizontal pixels adjacent said central pixel are compared with respect to second threshold value.

The first threshold value and second threshold value may preferably have a non-linear relationship with respect to each other for varying quantization parameter values of said image.

Suitably, the selected threshold values may be retrieved from a look-up table containing values for respective quantization parameter values.

Preferably, the modifying step may include modifying at least some of said selected pixel values based on values of at least some of said neighboring pixel values in said three by three array.

Suitably, the modifying step may further include modifying least some of said selected pixel values by addition of a value thereto that is related to the selected quantization parameter.

Preferably, the modifying step may comprise:
calculating a new pixel value for a selected pixel that is identified as not being an edge pixel; and
limiting a maximum difference between the new pixel value and original value of said selected pixel such that said maximum difference is no greater than said quantization parameter.

The method may preferably further include a subsequent step of providing to a display said decoded image with pixel values that have been modified by the modifying step.

Alternatively, according to another form of the invention there is provided a decoder system for reducing quantization effects of a decoded image, the system comprising:
a receiver module with an output coupled to a decoding module;
a de-ringing module coupled to an output of the decoding module;
a processors coupled to the de-ringing modules, wherein in use the de-ringing module receives at least part of a decoded image, decoded by the decoding module, comprising decoded blocks that were decoded from transform coded blocks quantized by a selected quantization parameter; the de-ringing module then analyzes selected pixel values of selected pixels with neighboring pixel values of associated neighboring pixels in said decoded blocks to determine difference values for each of said selected pixels; the de-ringing module then detects potential object edges, of the decoded image represented by the decoded blocks, to identify said selected pixels as edge pixels, said detecting being effected by comparing said difference values with selected threshold values that are determined with respect to said selected quantization parameter associated with a selected one of said blocks, said selected threshold values having a non-linear relationship with varying quantization parameter values of said image; and then the de-ringing module modifies said selected pixel values of said selected pixels that are identified as not being edge pixels.

Suitably, the de-ringing module can be coupled to an output of the decoding module via a de-blocking module.

Preferably, the de-ringing module may analyze the selected pixel values by selecting three by three pixel arrays and comparing only said selected pixel values that are associated with a central pixel of each of said arrays with said neighboring pixel values of only said neighboring pixels that are adjacent to and either aligned directly vertical with or horizontal with said central pixel.

The de-ringing module may, in use, detect potential object edges by a first comparison with respect to first threshold value and a second comparison with respect to second threshold value wherein pairs of said directly aligned vertical pixels adjacent said central pixel and pairs of said directly aligned horizontal pixels adjacent said central pixel are compared with respect to second threshold value.

Suitably, the first threshold value and second threshold value may have a non-linear relationship with respect to each other for varying quantization parameter values of said image.

Preferably, the selected threshold values may be retrieved from a look-up table containing values for respective quantization parameter values.

BRIEF DESCRIPTION OF THE DRAWINGS

In order that the invention may be readily understood and put into practical effect, reference will now be made to a preferred embodiment as illustrated with reference to the accompanying drawings in which.

DETAILED DESCRIPTION OF A PREFERRED EMBODIMENT OF THE INVENTION

Figure 1:
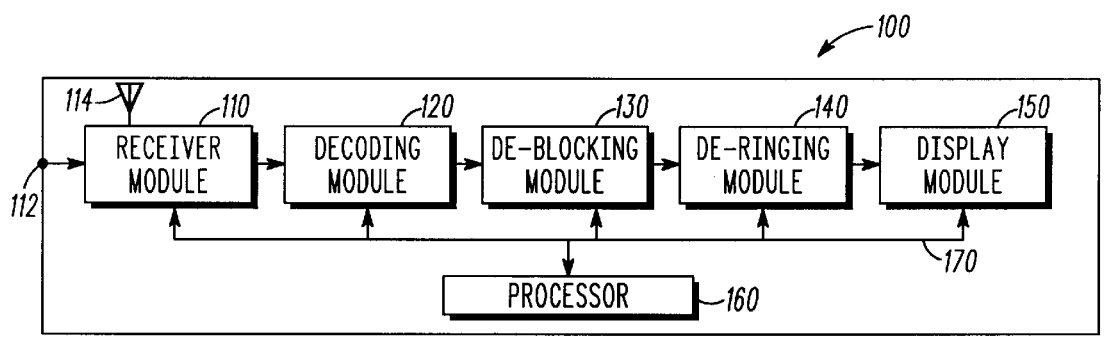
FIG. 1 is a schematic block diagram of a video decoding system in accordance with the present invention.

In the drawings, like numerals on different Figs are used to indicate like elements throughout. Referring to FIG. 1, there is illustrated a video decoding system 100 comprising a receiver module 110 with a cable port 112 for receipt of images through a network and an antenna 114 for receipt of images by radio communications. Alternatively the images can be received, at port 112, via a recorded medium such as a CD-ROM. An output of the receiver module is coupled to a decoding module 120 that has an output coupled to an input of a de-blocking module 130. An output of the de-blocking module 130 is coupled to an input of a de-ringing module 140 having an output coupled to a input of a display module 150. All of the modules 110,120,130, 140,150 are coupled to a processor 160 by a common combined data and address bus 170.

Figure 2:
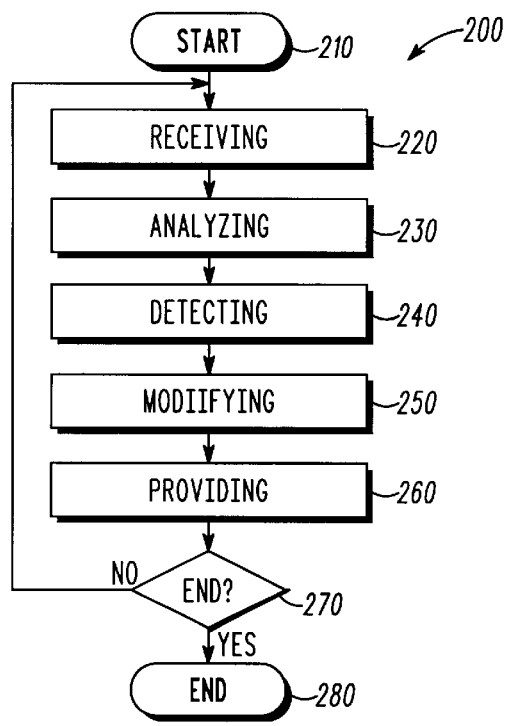
FIG. 2 illustrates a method for reducing quantization effects of a decoded image decoded by the system of FIG. 1.

In use, the system 100 receives a coded image stream at either the cable port 112 or antenna 114 or via a digitally stored medium. The receiver module 110 performs demodulation and filtering as required on the coded image stream and the decoding module 120 decodes the coded image stream to provide a decoded image. The de-blocking module 130 then performs de-blocking, to reduce the effects of blocking artifacts caused by the decoded image being composed of discrete blocks. The decoded image is then processed by the de-ringing module 140 to reduce quantization effects (typically ringing artifacts), thereafter the image is displayed by the display module 150. The operation of the system 100 is controlled by the processor 160, as will be apparent to a person skilled in the art, and the processor 160 may include large memory storage capabilities for storing the decoded image after the quantization effects (ringing artifacts) have been reduced by the de-ringing module 140. Referring to FIG. 2 there is illustrated a method 200 for reducing quantization effects of a decoded image decoded by the system 100. The method 200 is performed by the de-ringing module 140 and it is initiated by the processor 160 determining that a decoded image is to be processed and thereby a start step 210 is invoked. After the start step 210 there is a receiving step 220 that effects a receiving of at least part of the decoded image comprising decoded blocks that were decoded from transform coded blocks quantized by a selected quantization parameter during coding of the image. An analyzing step 230 then performs analyzing selected pixel values of selected pixels with neighboring pixel values of associated neighboring pixels in the decoded blocks to determine difference values for each of the selected pixels. The analyzing step 230 comprises selecting three by three pixel arrays and comparing only the selected pixel values that are associated with a central pixel of each of the arrays with the neighboring pixel values of only the neighboring pixels that are adjacent to and either aligned directly vertical with or horizontal with the central pixel.

Figure 3:
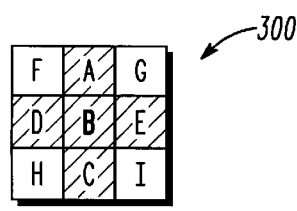
FIG. 3 is a schematic block diagram illustrating a three by three filtering window used in the method of FIG. 2.

In FIG. 3, there is illustrated an example of a three by three pixel array 300 comprising pixels A, B, C, D, E, F, G, H and I. The central pixel or selected pixel is pixel B and the neighboring pixels that are aligned directly vertical with the central pixel are pixels A and C. Further, the neighboring pixels that are aligned directly horizontal with the central pixel are pixels D and E.

Returning to FIG. 2, after step 230 a detecting step 240 effects detecting potential object edges, of the decoded image represented by the decoded blocks, to identify the selected pixels as edge pixels. The detecting is effected by comparing difference values with selected threshold values that are determined with respect to the selected quantization parameter associated with a selected one of the blocks. The selected threshold values have a non-linear relationship with varying quantization parameter values of the image. The comparing comprises a first comparison with respect to first threshold value QP1. A second comparison is also performed with respect to second threshold value QP2 wherein pairs of the directly aligned vertical pixels adjacent said central pixel and pairs of the directly aligned horizontal pixels adjacent the central pixel are compared with respect to second threshold value QP2. The first threshold value QP1 and second threshold value QP2 have a non-linear relationship with respect to each other for varying quantization parameter values QP of the image. The selected threshold values QP1, QP2 are retrieved from a look-up table containing values for respective quantization parameter values. The look up table is shown in table 1 and shows the non-liner relationships of the threshold values QP1, QP2 relative to varying quatization parameter values QP used during coding of the image.

The edge detection is performed by comparing the difference of the pixel values neighboring pixel B with a threshold. The threshold for each pixel is dependent on the Quantization Parameter value QP corresponding to the pixel. For example the edge detection process for the illustrated array firstly is performed using pixels A, B, C, D and E.

The check for vertical and horizontal edges is performed in accordance with the following inequalities:

{Horizontal Edge Detection}
    IF |B-A| > QP1 AND |B-C| > QP1 THEN
        Edge = 1;
    ELSE IF |A-C| > QP2 THEN
        Edge = 1;
{Vertical Edge Detection}
    IF |B-D| > QP1 AND |B-E| > QP1 THEN
        Edge = 1;
    ELSE IF |D-E| > QP2 THEN
        Edge = 1.
{|B-A|, |B-C|, |B-D| and |B-E| are the absolute difference
values resulting from the analyzing step 230}

Where: QP1 and QP2 are the threshold values dependent on the Quantization Parameter value QP; and 'Edge' is a Boolean variable which is set to 1 only if an edge is located (otherwise EDGE is set to 0).

After the detecting step 240 there is a modifying step for modifying the selected pixel values of the selected pixels that are identified as not being edge pixels. A providing step 260 then effects providing to the display module 150 decoded image with pixel values that have been modified by the modifying step 250. The steps 220 to 260 are repeated until the processor 160 determines at a test step 270 that no decoded image is required to be further processed and the method 200 therefore terminates at an end step 280.

In the modifying step 250, if a selected pixel is determined as being an edge pixel of an object, then no further processing is performed. However if the pixel is not classified as being an edge pixel then it undergoes filtering. The filtering performs a smoothing operation on all the pixels which have been identified as non-edge pixels indicative of edges of objects in the image. The filtering firstly involves calculating a new pixel value B_new for pixel B. Secondly a limiting process is performed to ensure that the maximum difference between the new pixel value B_new and the original pixel value is no greater than QP. The afore mentioned calculation and limitation processes are performed in accordance with the following algorithm:

IF (Edge == 0) THEN    {IF EDGE NOT DETECTED}
    B_new = (4*B + 2*A + 2*C + 2*D + 2*E +F +G +H +I +8)/16;
    max_diff = QP;
    IF (B_new − B > max_diff)
        THEN B = B + max_diff;
    ELSE IF (B − B_new > max_diff)
        B = B − max_diff;
    ELSE
        B = B_new.

Color video signals are usually comprised of three color channels, these being one luminance (Y) channel and two chrominance (U, V) channels. Generally the above deringing techinique is only required to be performed on the luminance channel. Performing de-ringing on the chrominance channels (U, V) have no (or little) noticeable effect on the quality of the reconstructed image. The decoded luminance data is read in from a buffer in processor 160 to the de-ringing module 140 as a series of three by three pixel arrays wherein the arrays are subjected to the de-ringing process of the present invention. The filtered luminance data is the output back to the buffer before being recombined with the decoded data from the two chrominance channels before being displayed by display module 150.

TABLE 1

Look up table for thresholds values QP1 and QP2 for varying values of quantiztion parameter QP.

| QP | QP1 | QP2 |
|---|---|---|
| 1 | 1 | 2 |
| 2 | 2 | 4 |
| 3 | 3 | 6 |
| 4 | 4 | 8 |
| 5 | 5 | 10 |
| 6 | 6 | 12 |
| 7 | 7 | 14 |
| 6 | 8 | 16 |
| 9 | 8 | 17 |
| 10 | 8 | 17 |
| 11 | 8 | 17 |
| 12 | 8 | 17 |
| 13 | 9 | 17 |
| 14 | 9 | 17 |
| 15 | 9 | 17 |
| 16 | 9 | 17 |
| 17 | 10 | 18 |
| 18 | 10 | 18 |

TABLE 1-continued

Look up table for thresholds values QP1 and QP2 for varying values of quantiztion parameter QP.

| QP | QP1 | QP2 |
|----|-----|-----|
| 19 | 11 | 19 |
| 20 | 12 | 20 |
| 21 | 12 | 20 |
| 22 | 12 | 21 |
| 23 | 12 | 21 |
| 24 | 12 | 21 |
| 25 | 12 | 21 |
| 26 | 13 | 21 |
| 27 | 13 | 21 |
| 28 | 14 | 22 |
| 29 | 14 | 22 |
| 30 | 15 | 22 |
| 31 | 15 | 22 |
| 32 | 16 | 23 |

Advantageously, the detecting and modifying (filtering) steps of the present invention reduce memory access overheads in post processing of the decoded image. The present invention enables the de-ring process to be pipelined with a de-blocking function. The de-blocking module accesses memory across block boundaries to remove blocking artifacts from the decoded image. Under certain prior art processing schemes the de-blocked image regions would need to be stored to memory in processor 160 so that a macro block can be formed before proceeding to the de-ringing module.

The detailed description provides preferred exemplary embodiments only, and is not intended to limit the scope, applicability, or configuration of the invention. Rather, the detailed description of the preferred exemplary embodiments provides those skilled in the art with an enabling description for implementing a preferred exemplary embodiment of the invention. It should be understood that various changes may be made in the function and arrangement of elements without departing from the spirit and scope of the invention as set forth in the appended claims.

We claim:

1. A method for reducing quantization effects of a decoded image, the method comprising the steps of:

receiving at least part of a decoded image comprising decode blocks that were decoded from transform coded blocks quantized by a selected quantization parameter;

analyzing selected pixel values of selected pixels with neighboring pixel values of associated neighboring pixels in said decoded blocks to determine difference values for each of said selected pixels;

detecting potential object edges, of the decoded image represented by the decoded blocks, to identify said selected pixels as edge pixels, said detecting being effected by comparing said difference values with selected threshold values that are determined with respect to said selected quantization parameter associated with a selected one of said blocks, said selected threshold values having a non-linear relationship with varying quantization parameter values of said image; and modifying said selected pixel values of said selected pixels that are identified as not being edge pixels.

2. The method as claimed in claim 1, wherein said analyzing step comprises selecting three by three pixel arrays and comparing only said selected pixel values that are associated with a central pixel of each of said arrays with said neighboring pixel values of only said neighboring pixels that are adjacent to and either aligned directly vertical with or horizontal with said central pixel.

3. The method as claimed in claim 2, wherein the detecting step is characterized by said comparing comprising a first comparison with respect to first threshold value, and wherein the detecting step further includes a second comparison with respect to second threshold value wherein pairs of said directly aligned vertical pixels adjacent said central pixel and pairs of said directly aligned horizontal pixels adjacent said central pixel are compared with respect to second threshold value.

4. The method as claimed in claim 3, wherein said first threshold value and second threshold value have a non-linear relationship with respect to each other for varying quantization parameter values of said image.

5. The method as claimed in claim 1, wherein said selected threshold values are retrieved from a look-up table containing values for respective quantization parameter values.

6. The method as claimed in claim 2, wherein the modifying step includes modifying at least some of said selected pixel values based on values of at least some of said neighboring pixel values in said three by three array.

7. The method as claimed in claim 6, wherein said modifying step further includes modifying at least some of said selected pixel values by addition of a value thereto that is related to the selected quantization parameter.

8. The method as claimed in 4 wherein the modifying step comprises:

calculating a new pixel value for a selected pixel that is identified as not being an edge pixel; and limiting a maximum difference between the new pixel value an original value of said selected pixel such that said maximum difference is no greater than said quantization parameter.

9. The method as claimed in 1, further including a subsequent step of providing to a display said decoded image with pixel values that have been modified by the modifying step.

* * * * *

UNITED STATES PATENT AND TRADEMARK OFFICE
CERTIFICATE OF CORRECTION

PATENT NO. : 6,807,317 B2
DATED : October 19, 2004
INVENTOR(S) : Mathew et al.

It is certified that error appears in the above-identified patent and that said Letters Patent is hereby corrected as shown below:

Column 7,
Line 46, change "decode" to -- decoded --.

Column 8,
Line 47, change "an" to -- and --.

Signed and Sealed this

Twenty-fourth Day of January, 2006

JON W. DUDAS
*Director of the United States Patent and Trademark Office*

(12) EX PARTE REEXAMINATION CERTIFICATE (7830th)
United States Patent
Mathew et al.

(10) Number: US 6,807,317 C1
(45) Certificate Issued: Oct. 26, 2010

(54) METHOD AND DECODER SYSTEM FOR REDUCING QUANTIZATION EFFECTS OF A DECODED IMAGE

(75) Inventors: Reji Mathew, Riverwood (AU); Jian Zhang, Enfield (AU)

(73) Assignee: Motorola, Inc., Schaumburg, IL (US)

Reexamination Request:
No. 90/010,798, Dec. 23, 2009

Reexamination Certificate for:
Patent No.: 6,807,317
Issued: Oct. 19, 2004
Appl. No.: 10/280,903
Filed: Oct. 25, 2002

Certificate of Correction issued Jan. 24, 2006.

(51) Int. Cl.
*G06K 9/40* (2006.01)
*G06K 9/46* (2006.01)
*H04N 7/12* (2006.01)

(52) U.S. Cl. .................. 382/266; 382/233; 382/251; 375/240.29

(58) Field of Classification Search .................. None
See application file for complete search history.

(56) References Cited

U.S. PATENT DOCUMENTS

| 6,539,060 B1 | 3/2003 | Lee et al. |
| 2001/0017944 A1 | 8/2001 | Kalevo et al. |

OTHER PUBLICATIONS

ITU—Telecommunications Standardization Sector, Study Group 16, Video Coding Experts Group (Question 15), Tenth Meeting: Osaka, May 16–18, 2000, "Definition of the new coding elements from Telenor," Document Q15–J–28, Filename: q15j28, doc (Generated May 5, 2000) (25 pages).
ITU—Telecommunications Standardization, Sector, Study Group 16, Video Coding Experts Group (VCEG), Twelfth Meeting: Eibsee, Germany, Jan. 9–12, 2001, "Reduced Complexity Loop Filter," Document VCEG–L25, Filename: VCEG–L25.doc (Generated Dec. 18, 2000) (2 pages).

*Primary Examiner*—Colin M Larose

(57) ABSTRACT

A method (200) and decoder system (100) for reducing quantization effects or ringing artifacts imposed upon decoded image of hybrid block based coding schemes such as MEPG and H 261. The system (100), in use, and method (200) receive (220) decoded image decoded blocks that were decoded from transform coded blocks quatized by a selected quantization parameter. The system (100) and method (200) then analyze (230) selected pixel values of selected pixels with neighboring pixel values of associated neighboring pixels in the decoded blocks to determine difference values for each of the selected pixels. Potential object edges, of the decoded image represented by the decoded blocks, are then detected (240) to identify the selected pixels as edge pixels, the detecting is effected by comparing the difference values with selected threshold values that are determined with respect to the selected quantization parameter associated with the blocks. The selected threshold values have a non-linear relationship with varying quantization parameter values of the image. The selected pixel values are modified (250) if they are not identified as edge pixels.

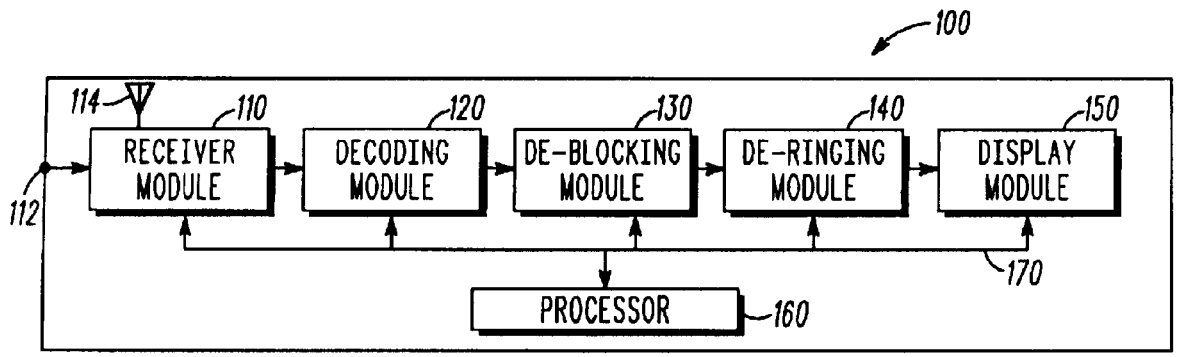

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 2-4 and 6 is confirmed.

Claims 1, 5 and 9 are cancelled.

Claims 7 and 8 were not reexamined.

* * * * *